Jan. 27, 1970 R. D. HAY 3,492,500
SOLID STATE CONTROL MODULES HAVING OPTIMIZED COMPATABILITY WITH ELECTROMECHANICAL COMPONENTS AND SYSTEMS
Filed Aug. 5, 1966
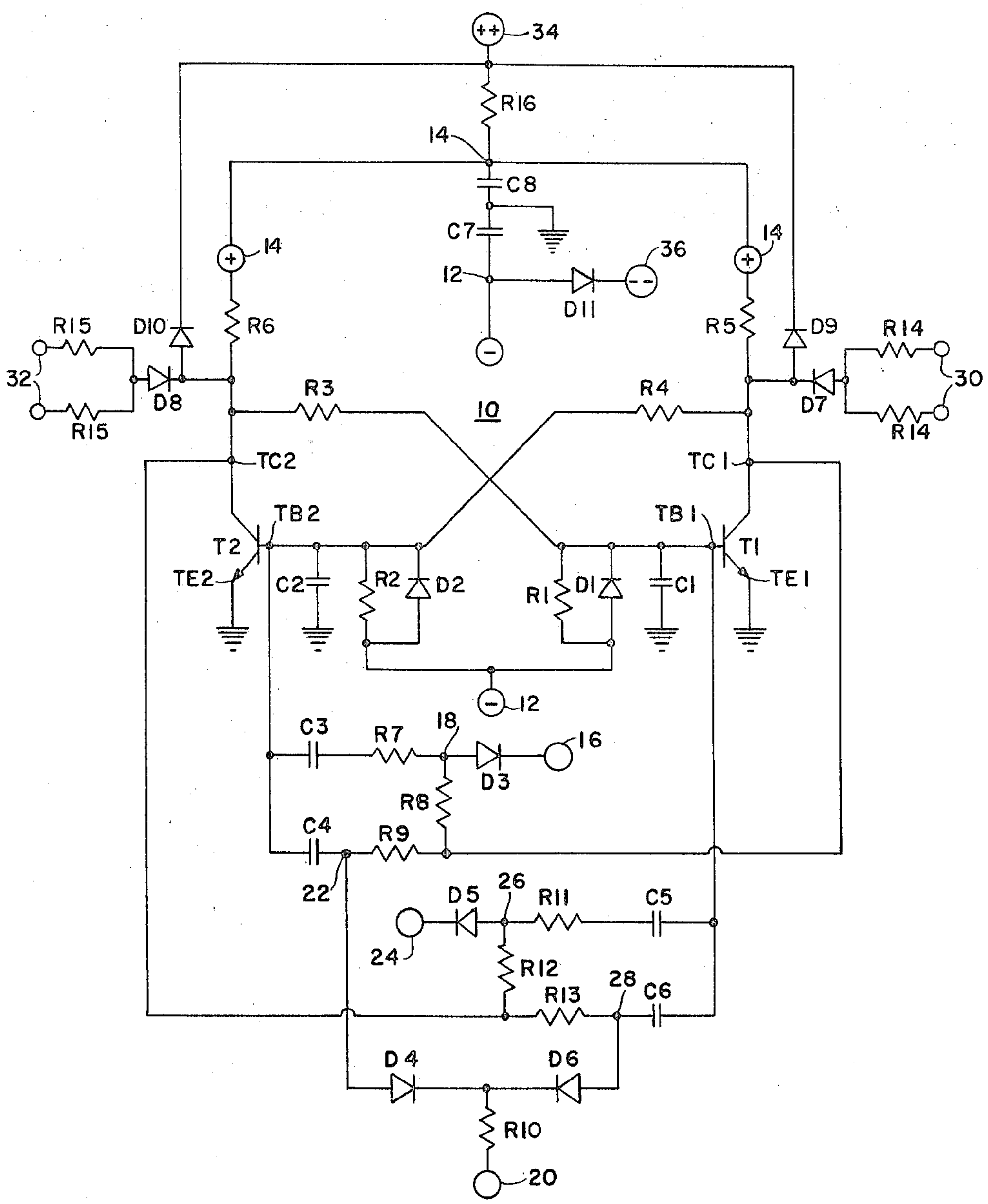
INVENTOR
Robert D. Hay
BY Birch & Birch
ATTORNEYS United States Patent Office 3,492,500

Patented Jan. 27, 1970

3,492,500

SOLID STATE CONTROL MODULES HAVING OPTIMIZED COMPATIBILITY WITH ELECTROMECHANICAL COMPONENTS AND SYSTEMS

Robert D. Hay, Washington, D.C., assignor to Foringer and Company, Inc., Rockville, Md., a corporation of Maryland Filed Aug. 5, 1966, Ser. No. 570,581
Int. Cl. H03k 5/08
U.S. Cl. 307—237 11 Claims

ABSTRACT OF THE DISCLOSURE

Circuitry is provided for the solid state, active, three terminal elements of logic circuitry which effects noise immunity to the extent that such logic circuitry can be utilized in interchangeable control modules and the like which are compatible with the high noise levels of electro-mechanical systems. This circuitry includes asymmetric bias voltage having its positive limit clamped to one output terminal and its negative limit clamped to the control terminal of a solid state device with the other output terminal maintained at ground or other intermediate potential between said asymmetric limits. Maximum signal voltage levels are maintained and the minimum energy levels of response are constrained to preclude response to short duration noise while the durations of supply fluctuations are minimized.

This invention relates to solid state control modules and more particularly to solid state control modules having optimized electrical noise immunity, resulting in optimized compatibility with electromechanical components and systems.

Heretofore, because of high sensitivity to the electrical noise inherent in electro-mechanical equipment, solid state control modules for operating and coordinating such equipment have been limited in application to equipment for which such modules have been specifically designed. Thus, a very limited or non-existent degree of interchangeability is present in such modules which is generally not the case with electro-mechanical units.

In the field of behavioral research, for example, there is a long felt need for general purpose solid state control modules that can be used to accommodate a large variety of digital control and data sorting problems over a wide and often undetermined range of experimental variables. The problem is compounded by the fact that in this field the medical research personnel utilizing such control and data systems either are not capable or lack the time to rebalance and re-adjust solid state components or modules in their experiment monitoring systems each and every time a new experimental range of variables is encountered.

Typical of most monitoring systems, the control section, comprised of control modules is coupled between a sensing system on one hand and a data recording system on the other.

In the specific example of behavioral research monitoring, as well as other present day systems, the data sensing system normally comprises a number of electro-mechanical devices such as pushbutton switches, micro-switches, telegraph keys, photocell sensors with relay contacts, and other like devices. The closing and opening of such switches is the source of the information to be processed through the control system and reduced to recorded data by the data recording system. Unfortunately, however, attendant to and inherent in the operation of such electro-mechanical devices is a high noise level occasioned by such things as contact chatter and sparking.

On the output or data recording side of the control system, the control modules provide output signals which must operate such devices as food and water dispensers, lamps, sound generators, and other devices driven by motors or solenoids. Such motors and solenoids are often powered by 24 volt direct current or 110 volt, 60 cycle, alternating current sources. Consequently, for example, if a control module is constrained to operate a solenoid or relay having a 24 volt D.C. coil, the inductive kick-back from the coil as well as sparking at the relay contacts will generate electrical noise.

Additional noise sources are encountered at the data output end of the monitoring equipment where the control modules are required to operate such devices as counters, recorders, indicators, printers, and automatic tape punches. All of these devices use substantial amounts of power through magnetic coils and create both magnetic and spark induced electrical noise against which the control modules must be protected.

Usually the data recording and control equipment are located in the same room and mounted on a common relay rack. The data sensing and motor function (for automated variation of experimental parameters) equipment are located in a different room but are connected by a multiple conductor cable to the control equipment. These cables are a source of A.C. coupled electrical noise of both inductive and capacitive origins.

Compounding the problem is the fact of many sources of radiated noise such as radios, X-ray machines, flashing electrical signs or even such things as fluorescent houselights in the same room. Further, variations in the power supplied to the solid state control modules with respect to established reference levels of energization comprise a form of direct coupled or conducted noise which can have adverse effects on the operation of these modules.

Basically, then, in order for solid state control modules to be interchangeable and compatible over a wide operating range with data processing systems and the like having electro-mechanical devices therein, these modules must be provided with optimum immunity to all types of noise, namely, radiated, D.C. coupled and A.C. coupled noise.

In the past provision of radiated noise immunity has required expensive shielding of equipment; provision of D.C. coupled noise immunity has required filtering networks; and provision of A.C. coupled noise immunity has required electrical buffering.

In sharp contrast to the prior art practices, the present invention provides optimized immunity to all three types of noise in solid state control modules and the like in a novel, simplified and lower cost manner than has heretofore been known in the art, resulting in optimized interchangeability and compatibility of such solid state modules with electro-mechanical systems.

It is therefore an object of this invention to provide new and novel means whereby solid state control modules are provided with optimized interchangeability and compatibility with electro-mechanical systems.

It is another object of this invention to provide new and novel means effecting optimized noise immunity in solid state circuit modules.

Yet another object of this invention is to provide new and novel means effecting optimized immunity to radiated D.C. coupled, and A.C. coupled noise in solid state circuit modules.

These and other objects of this invention will become more fully apparent with reference to the following specifications and drawing which relate to a preferred embodiment of the invention.

In the drawing:

The figure is a schematic circuit diagram of a bistable solid state circuit module embodying the present invention.

Referring in detail to the figure, a solid-state control module comprising a bistable or flip-flop circuit 10 is shown, including first and second transistors T1 and T2, respectively. The first transistor T1 has collector, base and emitter terminals TC1, TB1, and TE1, respectively. The second transistor T2 has collector, base and emitter terminals TC2, TB2, and TE2, respectively.

The first base TB1 is coupled through a first resistance R1 to a negative bias circuit node 12, the first resistance R1 being shunted by a first diode D1 having its cathode connected at the first base TB1; and is coupled to ground through a first capacitance C1.

The second base TB2 is coupled through a second resistance R2 to the negative bias circuit node 12, the second resistance R2 being shunted by a second diode D2 having its cathode connected at the second base TB2; and is coupled to ground through a second capacitance C2.

The first and second base terminals TB1 and TB2 are cross-coupled, respectively, to the second and first collector terminals TC2 and TC1 through third and fourth coupling resistances R3 and R4.

The first collector TC is connected to a positive bias circuit node 14 through a fifth dropping resistance R5 and the second collector TC2 is connected to the positive bias circuit node 14 through a sixth dropping resistance R6.

The first and second emitter terminals TE1 and TE2 are grounded.

The second base terminal TB2 is connected to a "set" input terminal 16 through a series connected third capacitance C3, seventh coupling resistance R7 and anode-cathode path of a third diode D3. The anode 18 of the third diode D3 is connected through an eighth resistance R8 to the first collector terminal TC1, the latter being connected through a ninth resistance R9, the anode-cathode path of a fourth diode D4 and a tenth resistance R10 to a "transfer" input terminal 20. The anode terminal 22 of the fourth diode D4 is coupled with the second base terminal TB2 through a fourth capacitance C4.

The first base terminal TB1 is connected to a "reset" input terminal 24 through a series connected fifth capacitance C5, eleventh resistance R11 and anode-cathode path of a fifth diode D5. The anode 26 of the fifth diode D5 is connected through a twelfth resistance R12 to the second collector terminal TC2, the latter being connected through a thirtheenth resistance R13, the anode-cathode path of a sixth diode D6 and the tenth resistance R10 to the "transfer" input terminal 20. The anode terminal 28 of the sixth diode D6 is coupled with the first base terminal TB1 through a sixth capacitance C6.

The first and second collector terminals TC1 and TC2 are connected to the "set" and "reset" output terminals 30 and 32, respectively, through the cathodes of seventh and eighth diodes D7 and D8 and respectively associated parallel resistances R14 and R15, connected between the said output terminals and the anodes of the said diodes D7 and D8.

The first and second collector terminals TC1 and TC2 are connected to the main positive supply terminal 34 by means of ninth and tenth clamping diodes D9 and D10, respectively.

The negative bias terminal 12 is connected to the main negative supply terminal 36 through the anode-cathode path of an eleventh clamping diode D11; and it is further connected to ground through a seventh capacitance C7.

The positive bias terminal 14 is connected to the positive supply terminal 34 through a sixteenth resistance R16; and it is further connected to ground through an eighth capacitance C8.

OPERATION

The operation of flip-flop solid-state logic circuit modules including "set," "reset" and "transfer" inputs being generally well understood in the art, the operation of the present invention will be described in terms of the effect of the various elements in FIGURE 1 in providing optimized immunity to noise in the flip-flop circuit 10.

The following is a table of the circuit elements of the control module of the figure, illustrating the relative values and/or standard designations of related elements for the purpose of clearly defining their respective noise elimination functions.

DIODES

Diode D1—IN34A
Diode D2—IN34A
Diode D3—IN4004
Diode D4—IN4004
Diode D5—IN4004
Diode D6—IN4004
Diode D7—IN4004
Diode D8—IN4004
Diode D9—IN34A
Diode D10—IN34A
Diode D11—IN4004

CAPACITANCES

Capacitance C1—0.001 microfarads
Capacitance C2—0.001 microfarads
Capacitance C3—0.01 microfarads
Capacitance C4—0.01 microfarads
Capacitance C5—0.01 microfarads
Capacitance C6—0.01 microfarads
Capacitance C7—30 microfarads–15 volts
Capacitance C8—25 microfarads–30 volts

RESISTANCES

Resistance R1—2K–½ w.
Resistance R2—2K–½ w.
Resistance R3—3K–½ w.
Resistance R4—3K–½ w.
Resistance R5—820 ohms–1 w.
Resistance R6—820 ohms–1w.
Resistance R7—1K–½ w.
Resistance R8—10K–½ w.
Resistance R9—10K–½ w.
Resistance R10—1K–½ w.
Resistance R11—1K–½ w.
Resistance R12—10K–½ w.
Resistance R13—10K–½ w.
Resistance R14—180 ohms–2w.
Resistance R15—180 ohms–2w.
Resistance R16—39 ohms–½ w.
(R1 through R4—5% tolerance; R5 through R16–10% tolerance)

TRANSISTORS

Transistor T1—2N3405
Transistor T2—2N3405

BIAS VOLTAGES

Main Positive Supply (terminal 34) +24 volts
Main Negative Supply (terminal 36) −4 volts

RADIATED NOISE

Radiated noise is comprised of two types, electro-static and magnetic. The electro-static noise is associated with the back EMF of contacts breaking inductive loads such as motors and solenoids. The magnetic noise, usually the most severe of the two in an electro-mechanical equipment environment, results from sudden magnetic field variations occasioned by such as making and breaking inductive loads, and such noise directly acts on all parts of a circuit which are unshielded.

Radiated noise adversely manifests itself in circuits as spurious voltages and currents which are induced into affected circuits, causing false triggering (i.e. changes of state in solid state logic modules).

In order to minimize the amplitude and duration of induced voltages, it has been established that there must be relatively low impedances in the circuit affected. Unfortunately, however, in order to minimize the induced currents in an affected circuit, the impedances must be relatively high.

The present invention resolves, in part, these conflicting theories of induced noise voltage and noise current attenuation by selectively increasing the normal operating current and voltage levels resulting in a factor of safety in solid-state logical control modules and the like which will permit same to absorb radiated noise induced signals without undergoing a change of state.

Referring specifically to the figure, and assuming the first transistor T1 is turned off and the second transistor T2 is turned on (saturated), the impedance, reference to ground, to the first base terminal TB1 is that of the parallel combination of first and third resistances R1 and R3 and the first capacitance C1. The resistance of this combination is 1.2 K which is relatively low. Since the first base TB1 is back biased when the first transistor T1 is in the off state, the loop impedance through the second transistor T2 is the sum of the first and third resistances R1 and R3 or 5 K.

The loop comprising the first diode and capacitance D1 and C1 is made small in area by placing these elements in close proximity and therefore, induced noise in this loop is negligible. The grouping of the second capacitance C2 and second diode D2 is a similar small area loop adjacent the second base terminal. Thus, induced noise currents at the transistor bases in the loops C1–D1 and C2–D2 are rendered negligible with respect to the operating levels of the circuit module 10.

The back bias voltage on the first base TB1 is controlled by the parallel resistances R1 and R3 and is maintained at −2.4 v. requiring that an induced noise voltage of +2.4 v. must be established at the said first base TB1 to bring the said base TB1 to ground potential, i.e. approaching the threshold of a change of state, requiring that an even greater induced noise voltage be established to cause a spurious triggering or change of the state of the module 10.

Since the impedance to the first base TB1 is 1.2 K, the induced noise must have a power level of greater than $(2.4 \text{ v.})^2/1.2$ K or 4.8 milliwatts (mw.) to bring the circuit to the threshold of change. The circuit alternatively requires a net base current of 2 milliamps (ma.) or 20 mw. of power to raise the voltage at the first base TB1 to ground (OV) potential or threshold condition.

The first capacitance C1 requires an energy input of $2.88 \times 10^{-6}$ mw.-seconds to effect the necessary 2.4 v. rise at the first base TB1. While this seems to be a small amount of energy, it should be emphasized that as the duration of an induced radiated noise spike of a given energy becomes shorter its power level increases. Thus the required noise power level to effect a false triggering by charging the capacitance C1 increases as noise spike duration decreases and thereby precludes false triggering by high power levels of relatively short duration which would readily trigger conventional circuits having only fixed power thresholds.

Therefore, any induced noise signal appearing at the transistor bases TB1 and TB2 when the transistors T1 and T2 are in the off state must be of relatively prolonged duration and have a relatively high power level to effect a false triggering. The base capacitances C1 and C2 thus effectively shunt relatively high current spikes of relatively short duration and the low base impedances comprised of R1–R3 and R2–R4 in parallel and loop combinations require high power levels of relatively long duration in induced voltage or current noise signals to effect a false triggering threshold in the circuit module 10.

In the alternative condition or state in the circuit module 10, with the first transistor T1 turned on and the second transistor T2 turned off, the first base TB1 is forward biased and the circuit now presents two effective impedance loops comprised of the third and sixth resistances R3 and R6 in parallel with the first resistance R1. With the values tabulated above, the impedance to the base TB1 is now approximately 100 ohms and the effective loop impedance is approximately 1.3 K.

The forward bias voltage is 0.8 v. and the threshold voltage in the on-off direction is less than 0.1 v., requiring a noise power level of greater than $(0.7)^2/100=4.9$ mw. This is substantially the same power level required to effect a spurious triggering in the off-on direction.

In order to maintain a sufficient saturation of the first transistor T1 to prevent a change of state, a net base current of 1.1 ma. is required. However, in the circuit 10, the normal base current maintained to the first base TB1 is +6.3 ma. due to the resistances R3 and R6 and −2 ma. due to the resistance R1, or a net base current of 4.3 ma. This provides a net noise current opposing the normal current level of 3.2 ma. and a noise power level in excess of 12.3 mw. to effect a spurious triggering.

Therefore, in both cases (T1 off and T1 on), there is a deliberately controlled high factor of safety provided in the base circuitry of the first and second transistors T1 and T2 which may be tailored in any given instance to a wide range of expected noise levels.

Further, the normal operating levels in the off state of a transistor or the like are provided with a relatively high factor of safety as to power and duration of induced noise signals and in the on state of a transistor or the like are provided with a high factor of safety as to power and current levels of induced noise signals.

A.C. COUPLED NOISE

This type of noise signal results in false positive and negative input and output signals in the circuit module 10 of FIGURE 1. For the purpose of this description, this type noise occurs in parallel signal lines and cables and differs from the radiated type in that the noise signals are more effectively coupled and only occur on input and output lines.

Since the optimized noise immunities of the set and reset inputs 16 and 24 are of substantially the same effectiveness, the various effects of false input signals will be described with reference to the set input 16.

Assuming the circuit module 10 to be in the reset condition, i.e. first transistor T1 turned on and second transistor T2 turned off, several exemplary conditions will now be considered.

If there is an open connection on the end of the set input line connecting the set input 16 to other units, the effect of positive and negative noise signals at the set input 16 is as follows:

Positive input signal—this type of noise is effectively blocked from the second base terminal TB2 by the third diode D3.

Negative inputs—since these signals can affect the voltage at the second base terminal TB2 and cause a spurious change of state, there is a safety factor achieved by the use of both high signal levels and high current requirements for noise signals.

For example, a negative input would have to draw 3.2 ma. from the second base terminal TB2 and in addition 0.7 ma. from the second capacitance C2 to effect a drop to ground potential in one (1) microsecond. Accordingly, 3.9 ma. is required in one (1) microsecond through the third capacitance C3 to effect a false triggering. Thus, an 0.30 v. change across the capacitance C3, a 3.9 v. drop across the seventh resistance R7 and an 0.7 v. drop across the third diode D3 for a total of 5 volts would be required. The 4.3 volt drop across the capacitance C3 and resistance R7 would require an additional 0.43 ma. to be drawn through the fifth resistance R5, making the total noise current requirement for false triggering 4.73 ma.

Therefore, with a 5 volt on 4.73 ma. requirement, a very high A.C. coupled noise rejection level is achieved at the inputs.

Now, if a "0" state signal voltage is present at the set input 16, from another loaded module (not shown) the "0" state voltage must be added to the 5 volt noise rejection level of the set input 16 increasing the rejection level of negative noise signals.

Further, if a "1" state input is present at the set terminal 16 from another unit (not shown) on the input line, a positive spurious or noise input must effect a 5 volt change in the third capacitance C3 through the seventh and eighth resistances R7 and R8, since all current from such a signal is blocked by the third diode D3, the capacitance C3 requires a 50 microsecond duration of a false positive input signal to effect a false change of state upon abrupt cessation of such a false input.

The effect of negative noise signal inputs for "1" state input conditions is substantially the same as for an open input condition.

With a "1" state input condition as well as an open input condition, and assuming for example the use of three feet of input line with a maximum capacitive coupling of 54 micromicrofarads per foot, the capacitance would be 195 mmfd. requiring a 29.4 volt noise signal at 4.73 ma./microsecond to effect a false trigger. Because of the 24 volt positive power supply voltage, no such voltage swing is possible in the circuit module 10 and no such false triggering can occur.

This length of input line would also only result in a maximum of approximately 0.7 volt induced by indirectively coupled A.C. noise, which is well below the 5 volt noise input signals required to bring the circuit module 10 to the threshold of a change of state.

With the module 10 in the set condition, set or reset input noise must be a positive pulse and these are precluded from effecting spurious triggering by the third and fifth blocking diodes D3 and D5, respectively.

At the transfer input terminal 20, the fourth and sixth blocking diodes D4 and D6 preclude positive noise pulses from effecting a false change of state in the circuit module 10. Negative noise signals at the transfer input 20 are precluded by the ninth, tenth and thirteenth resistances R9, R10 and R13 and the fourth and sixth capacitances C4 and C6 in a manner similar to that effected by the third capacitance C3 and seventh resistance R7 at the set input terminal 16. In addition the voltage division resistance combinations R9–R10 and R9–R11 increase the immunity of the transfer input 20 to false negative inputs.

At the output terminals 30 and 32, positive noise spikes in excess of 24 volts, which would normally cause collector-emitter breakdown in the transistors T1 and T2, are clamped to a 24 volt limit by the ninth and tenth clamping diodes D9 and D10. Further, negative noise spikes at the output are blocked by the seventh and eighth blocking diodes D8 and D7.

Positive noise spikes occurring on a "0" state output actually enhance the noise immunity by raising the normal 19 volt "0" state voltage at the collector terminals of the affected transistor; and occurring on a "1" output are limited in noise current effects by the fourteenth and fifteenth output resistances R14 and R15, thereby acting only as a short duration load and leaving the circuit module 10 unaffected.

Thus, it can be readily seen that in the provision of a maximized positive supply voltage (+24 volts) with a clamp for positive false inputs in excess thereof and a clamped asymmetric negative bias voltage (−4 volts) collector-emitter and base-emitter breakdown is precluded, respectively.

The use of this asymmetric clamped bias supply permits optimally high signal voltages and currents to be utilized, rendering magnetically induced noise levels negligible in comparison to the high voltage signal levels achieved and reducing the effect of capacitively coupled noise levels by means of the high signal current levels achieved. Thus, in combination with the lower impedance made possible at the base terminals TB1 and TB2 of the transistors T1 and T2 (or like active elements in other logic circuit modules) by the asymmetric negative bias, which further increases the noise immunity of the circuit module 10 (or like modules), optimizes noise immunity and compatibility of logical control modules with high noise electro-mechanical equipment.

D.C. COUPLED NOISE

This form of noise originates in the power supply and primarily in the distribution wiring of a system and can cause voltage fluctuations on the order of thirty percent (30%) in a given circuit module.

Adverse effects may be optimally minimized by minimizing the rise and fall times of such fluctuations, by substantially isolating the sensitive trigger effecting portions of a circuit module from such fluctuations and by using a safety factor in bias and signal voltages sufficient to allow the circuit module to operate properly at the selected higher and lower supply voltages.

The supply voltage of the circuit module 10 is regulated by the R–C filter network comprised of the sixteenth resistance R16, the seventh and eighth capacitances C7 and C8 and the clamping diodes D9, D10 and D11, this network being designed to minimize the amplitude of voltage fluctuations and spikes and minimize the rise and fall times of such noise disturbances.

Assume, for example, that a 7 volt drop with a sharp fall time occurs at the second collector terminal TC2 while the first transistor T1 is turned on. Under steady state conditions, this will result in a net base current into the first base terminal TB1 of 2.35 ma. via the resistances R1 and R3. However, since the minimum holding base current, as previously defined for the first base TB1, is 1.1 ma., there is a full 1.25 ma. excess current providing a safety factor which optimizes the immunity of the module 10 to such fluctuations. However, the sharp fall time of the disturbance will produce a total current of 1.33 ma. to the base TB1 via the resistances R11, R12, R13 and capacitances C5 and C6. Even though the 1.33 ma. resulting from the transient condition exceeds the safety factor of 1.25 ma., the energy delivered to the base TB1 is not sufficient to overcome the energy threshold constraint placed on the base TB1 by the capacitance C1.

If normal collector voltages are on the order of 20 volts, then a seven volt fluctuation is in excess of the thirty percent (30%) transient fluctuation. Thus, a high immunity to such transient fluctuations is provided in the circuit module 10.

This optimized immunity is in part provided by the use of the resistance coupling of the bases TB1 and TB2 to the positive bias terminal 14, thereby attenuating the fluctuations as opposed to capacitively coupling same to the said bases. Further, the first and second capacitances C1 and C2 at the first and second bases TB1 and TB2, respectively, enhance stability in the circuit module 10 against short duration transient conditions of D.C. coupled noise.

Thus, in addition to the previously described means for maximizing signal voltage strength and swing while maintaining relatively higher normal current levels through the use of an asymmetrical, clamped, bias supply, and the high immunity to radiated and A.C. coupled noise, there is provided a high rejection capability to transient direct coupled noise. This provides optimized immunity in the circuit module 10 and other solid state logical control modules to all forms of noise signals which might effect a false triggering (change to state) in such control modules.

Therefore, the present invention satisfies a long felt need in the art to effect solid state logical control modules which have such a high noise immunity as to be interchangeable and compatible with existing systems having electro-mechanical components and other environmental conditions producing high noise levels.

Without further description it is believed that the advantages of the present invention over the prior art is apparent and while only one embodiment of the same is illustrated, it is to be expressly understood that the same is not limited thereto as various changes may be made in the combination and arrangement of the parts illustrated, as will now likely appear to others and those skilled in the art.

What is claimed is:

1. In a logic circuit including a solid state active circuit element having a control electrode and first and second output terminals, means optimizing the immunity of said logic circuit to electrical noise to preclude false triggering of said logic circuit comprising power supply means providing an asymmetric bias voltage to said active element; first circuit means effecting an intermediate reference potential at said second output terminal of said active element; second circuit means effecting a resistance coupling of said control electrode to both sides of said power source; third circuit means effecting a capacitance coupling of said control electrode to said intermediate reference potential; fourth circuit means, including a signal input terminal and input leads, effecting a resistance-capacitance coupling between said control electrode and said signal input terminal; and fifth means including first and second clamping means clamping said control electrode and said first output terminal to the asymmetric limits of said asymmetric bias voltage and effecting a maximized signal voltage level for said logic circuit limited by the maximum clamped magnitude of said asymmetric bias voltage; said third and fourth circuit means being fully responsive to signals of a predetermined energy level or greater to effect a triggering of said logic circuit through said control electrode and precluding noise signals of lesser energy levels from triggering said logic circuit; said fifth means precluding noise signal voltages from exceeding the clamped asymmetric limits of said asymmetric bias voltage; and said second circuit means attenuating noise currents at said control electrode.

2. The invention defined in claim 1, wherein said input leads are limited in length to substantially preclude inductive and capacitive coupling of noise signals of greater than said predetermined energy level through said input terminal to said control electrode.

3. The invention defined in claim 1, wherein said input leads are limited in length to substantially preclude inductive and capacitive coupling of noise signals of greater than said predetermined energy level through said input terminal to said control electrode; and wherein said fourth circuit means includes unidirectional means selectively blocking signals of a predetermined polarity from said control electrode.

4. The invention defined in claim 1, wherein said power supply means further includes sixth circuit means minimizing the rise and fall times of transient power supply fluctuations.

5. The invention defined in claim 1, wherein said first output terminal of said active element includes seventh circuit means including attenuating means for signals of one polarity and blocking means for signals of the opposite polarity.

6. The invention defined in claim 1, wherein said input leads are limited in length to substantially preclude inductive and capacitive coupling of noise signals of greater than said predetermined energy through said input terminal to said control electrode; wherein said fourth circuit means includes unidirectional means selectively blocking signals of a predetermined polarity from said control electrode; and wherein said power supply means further includes sixth circuit means minimizing the rise and fall times of transient power supply fluctuations.

7. The invention defined in claim 1, wherein said input leads are limited in length to substantially preclude inductive and capacitive coupling of noise signals of greater than said predetermined energy level through said input terminal to said control electrode; wherein said fourth circuit means includes unidirectional means selectively blocking signals of a predetermined polarity from said control electrode; wherein said power supply means further includes sixth circuit means minimizing the rise and fall times of transient power supply fluctuations; and wherein said first output terminal of said active element includes seventh circuit means including attenuating means for signals of one polarity and blocking means for signals of the opposite polarity.

8. In a solid state logic circuit, including a solid state active element, compensatory circuit means rendering said logic circuit compatible with high noise level electro-mechanical equipment, said circuit means including the combination of a solid state active element including control and first and second output terminals, power supply means providing asymmetric positive and negative bias voltages, one of said voltages being substantially several times the magnitude of the other, first and second clamping means clamping said control terminal to the lesser of said bias voltages and clamping one of said output terminals to the other of said bias voltages, respectively, and means effecting a ground potential at the other of said output terminals.

9. The invention defined in claim 8, wherein said compensatory circuit means further includes circuit means at said control terminal substantially shunting signals of less than a predetermined energy level from said control terminal.

10. The invention defined in claim 8, wherein said power supply means further includes transient responsive circuit means minimizing the rise and fall times of transient variations in said bias voltages.

11. The invention defined in claim 8, wherein said compensatory circuit means further includes circuit means at said control terminal substantially shunting signals of less than a predetermined energy level from said control terminal; and wherein said power supply further includes transient responsive circuit means minimizing the rise and fall times of transient variations in said bias voltages.

References Cited

UNITED STATES PATENTS

| | | | |
|---|---|---|---|
| 3,173,023 | 3/1965 | Talsoe | 307—237 X |
| 3,300,772 | 1/1967 | Vinal | 307—237 X |
| 3,313,955 | 4/1967 | Des Brisay | 307—237 X |

ROY LAKE, Primary Examiner

JAMES B. MULLINS, Assistant Examiner

U.S. Cl. X.R.

307—292, 297